Dec. 2, 1930.  E. E. CAHOON  1,783,402
CHOCOLATE MOLDING MACHINE
Filed April 22, 1924   6 Sheets-Sheet 3
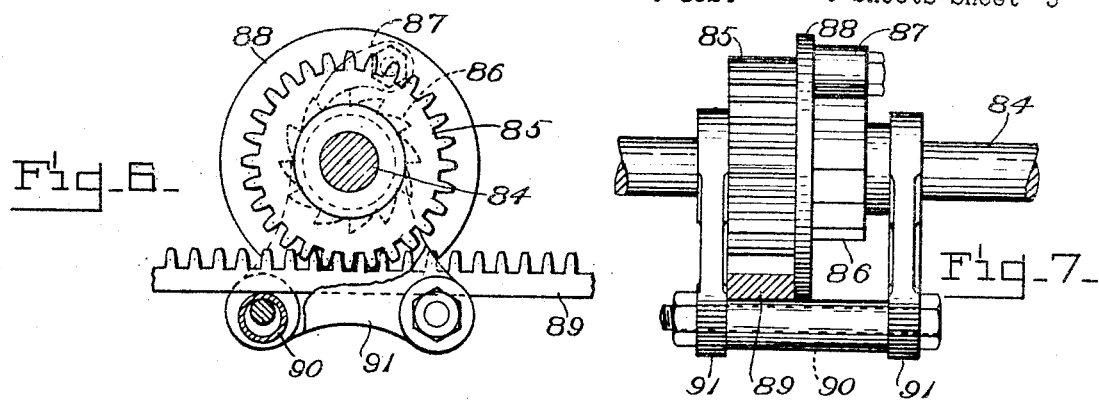
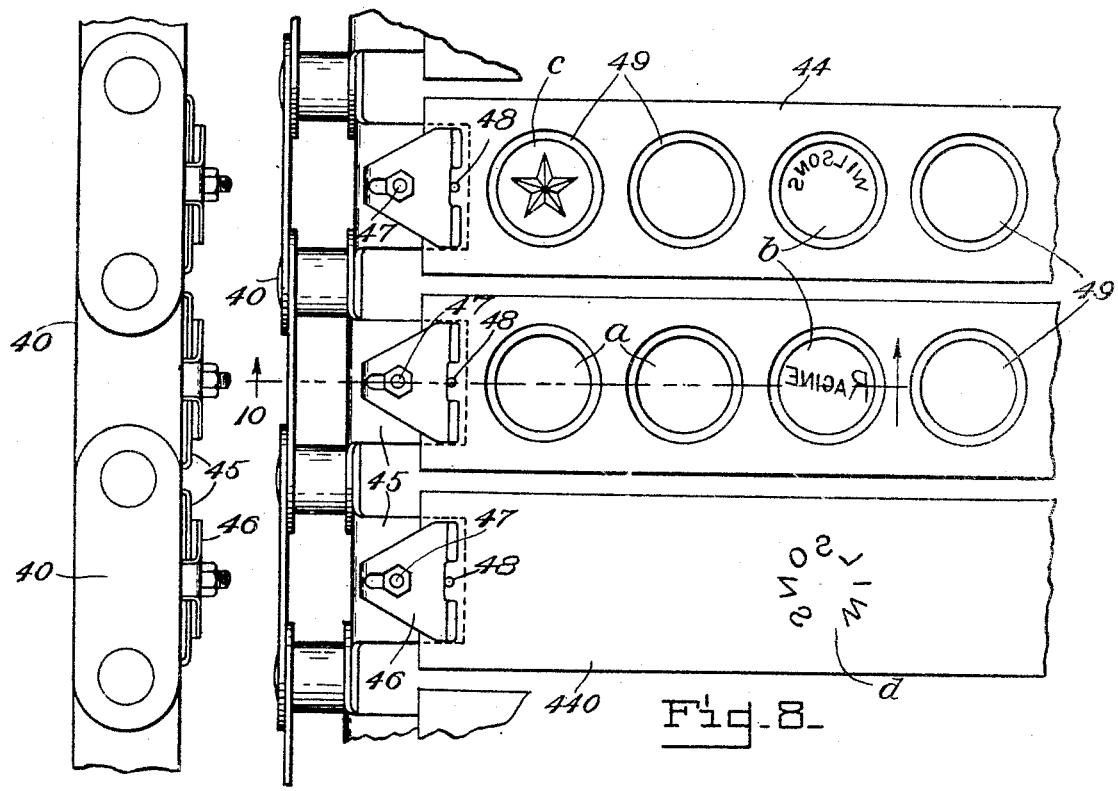
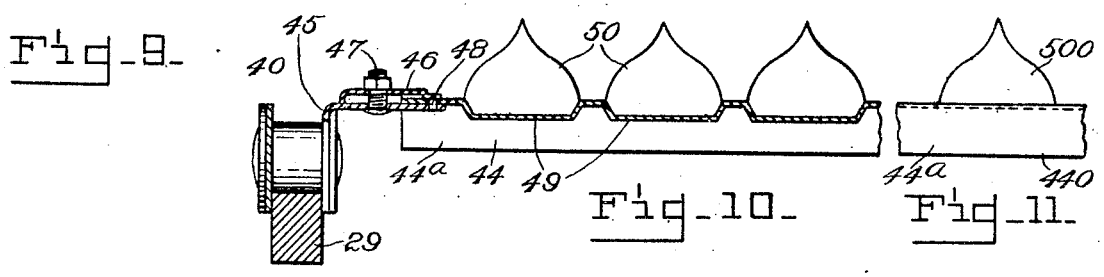
INVENTOR=
Edward E. Cahoon
by Macleod, Calver, Copeland & Dike,
ATTORNEYS Dec. 2, 1930.  E. E. CAHOON  1,783,402

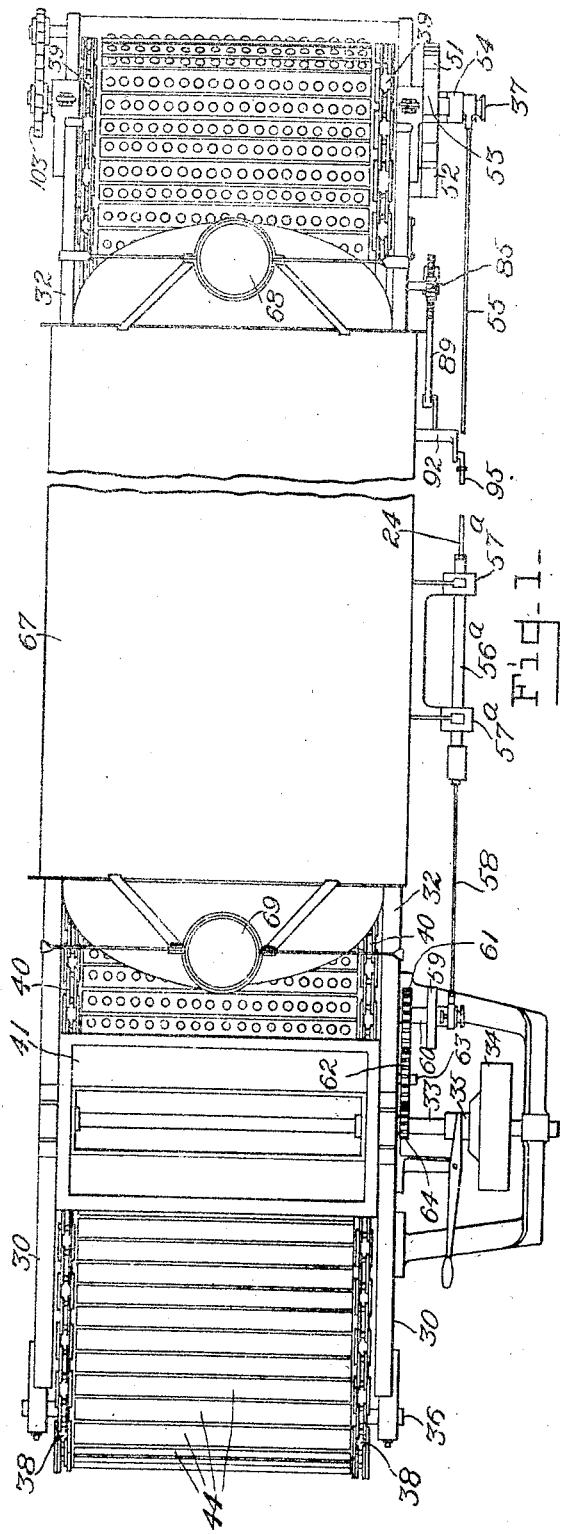
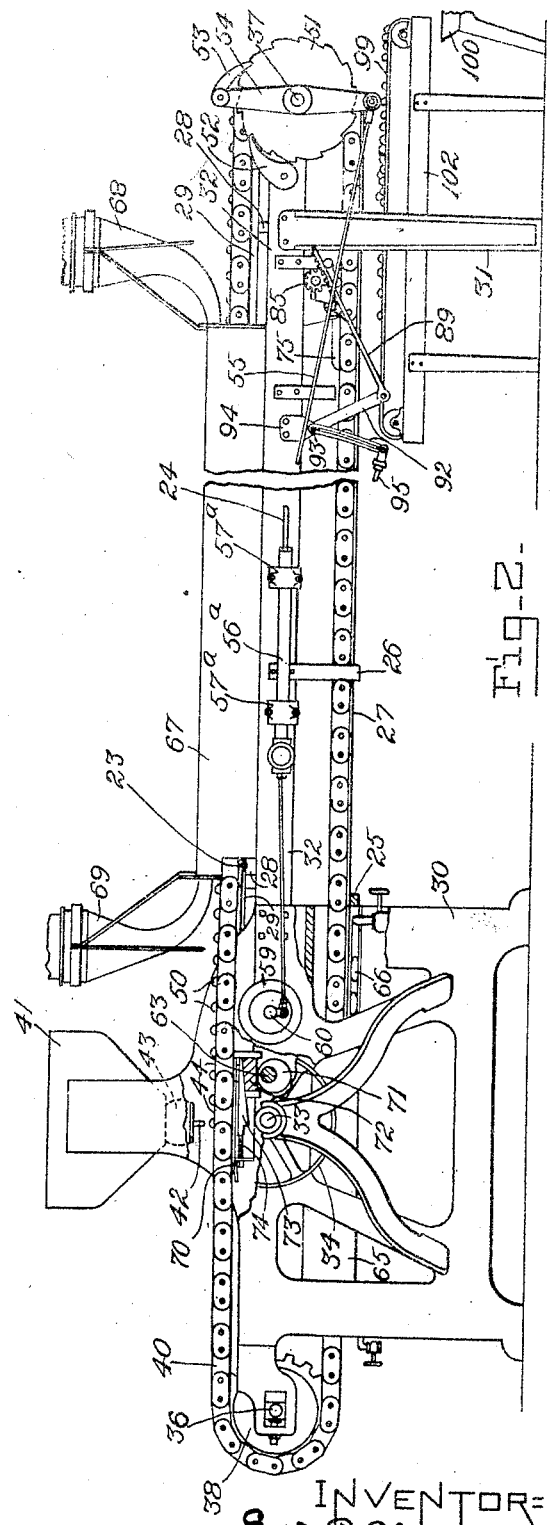

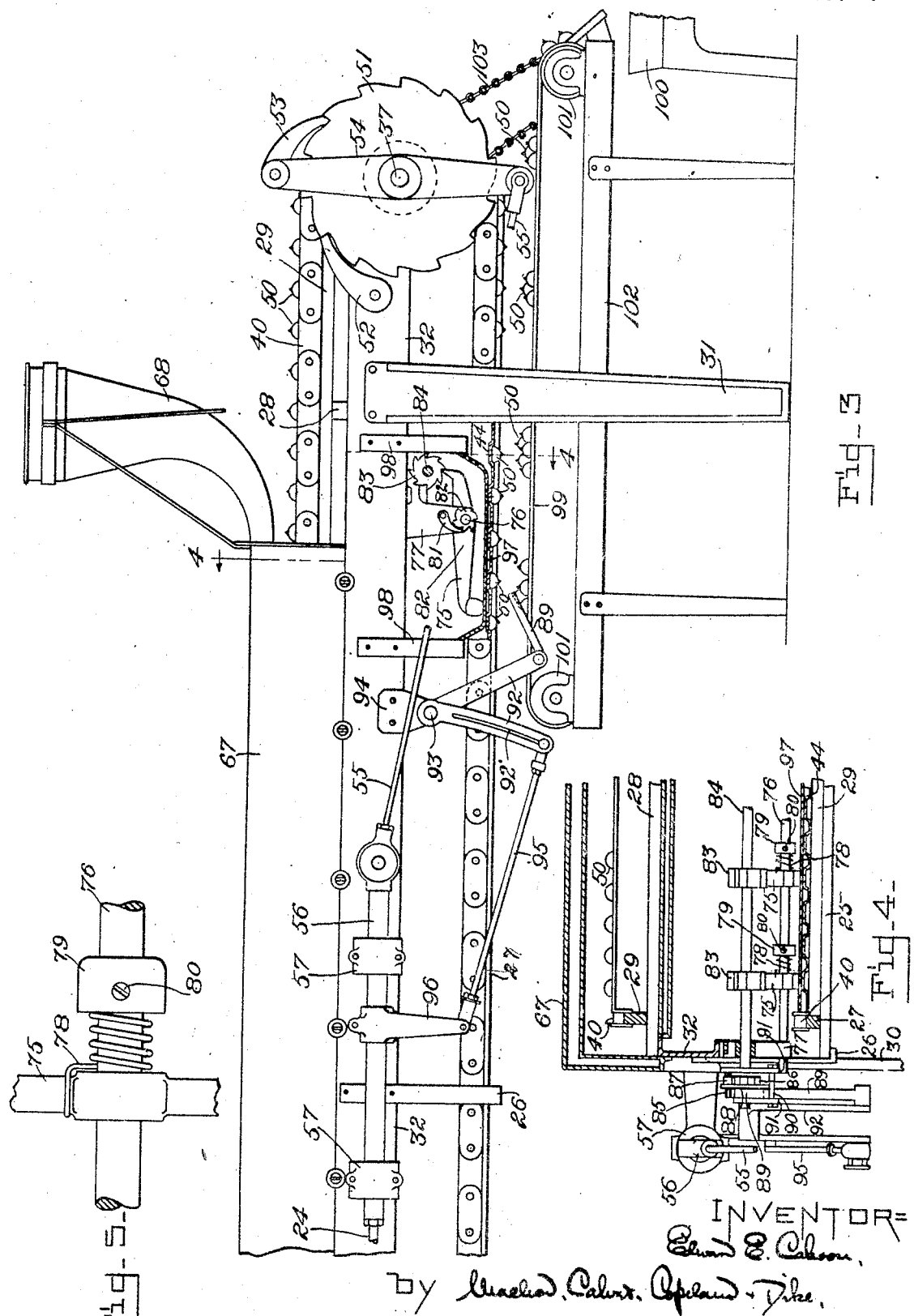

CHOCOLATE MOLDING MACHINE

Filed April 22, 1924  6 Sheets-Sheet 4

INVENTOR:
Edward E. Cahoon,
by Macleod, Calver, Copeland & Dike,
ATTORNEYS.

Dec. 2, 1930.  E. E. CAHOON  1,783,402
CHOCOLATE MOLDING MACHINE
Filed April 22, 1924  6 Sheets-Sheet 5

Dec. 2, 1930.  E. E. CAHOON  1,783,402
CHOCOLATE MOLDING MACHINE
Filed April 22, 1924  6 Sheets-Sheet 6

INVENTOR:
Edward E. Cahoon,
by Macleod, Calver, Copeland & Dike.
ATTORNEYS.

Patented Dec. 2, 1930

1,783,402

UNITED STATES PATENT OFFICE

EDWARD E. CAHOON, OF RACINE, WISCONSIN, ASSIGNOR TO RACINE CONFECTIONERS' MACHINERY COMPANY, OF RACINE, WISCONSIN, A CORPORATION OF WISCONSIN

CHOCOLATE-MOLDING MACHINE

Application filed April 22, 1924. Serial No. 708,278.

This invention relates especially, although not exclusively, to machines for making molded forms of chocolate or similar material, such, for example, as chocolate bars, wafers, buds, stars, shells, etc., and also for the manufacture of confections and the like which are impressed on their lower sides with the name or trade mark of the maker or with ornamental designs.

According to the present practice, molded or impressed forms of this character are made by depositing the plastic material in mold cavities or upon embossed surfaces of trays or frames which, before the depositing operation, are heated to approximately the temperature of the plastic material, are then inserted manually into the depositing machine, and are thereafter manually removed from said machine, carried to settling tables which vibrate or jar the molds sufficiently to settle the plastic material into the formations of the mold, as well as to free the chocolate from air pockets and distribute therethrough such nuts or other solid materials, if any, as may be included in the confections. The trays are then carried to a cooling or drying room to solidify the plastic material, after which they are taken by operators who invert and strike them with mallets in order to loosen and remove the confections or solidified deposits therefrom. These operations require a considerable amount of manual labor which it is the general object of the present invention to avoid by the provision of an automatic machine wherein all of the steps required in the manufacture of molded or impressed confections or the like, from the introduction of the constituent materials in bulk into the machine to the discharge of the completed articles therefrom, takes place continuously and automatically without attention on the part of the operator, thereby materially increasing the output and decreasing the cost of production of articles of this character.

The more particular objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise practiced without departure from the spirit and scope thereof.

In said drawings:

Fig. 1 is a plan view, partly broken out, of a machine constructed in accordance with the invention.

Fig. 2 is a side elevation, partly broken away, of the machine as shown in Fig. 1.

Fig. 3 is an enlarged side elevation, also partly broken away, of the rear end of the machine shown in Figs. 1 and 2 and including certain of the operative connections broken out in the latter figures.

Fig. 4 is a partial transverse section taken substantially on the line 4—4, Fig. 3.

Fig. 5 is a detail plan view illustrating the mounting of the hammers for jarring the receivers to free the latter of the solidified deposits.

Fig. 6 is a detail side elevation and Fig. 7 a detail rear elevation of a portion of the mechanism for operating the hammers.

Fig. 8 is an enlarged plan view of a portion of the conveyor with its individual receiving members.

Fig. 9 is a side elevation of the parts shown in Fig. 8.

Fig. 10 is a section taken substantially on the line 10—10, Fig. 8.

Fig. 11 is a detail edge view of a portion of the receiving member shown at the bottom in Fig. 8.

Figure 12:
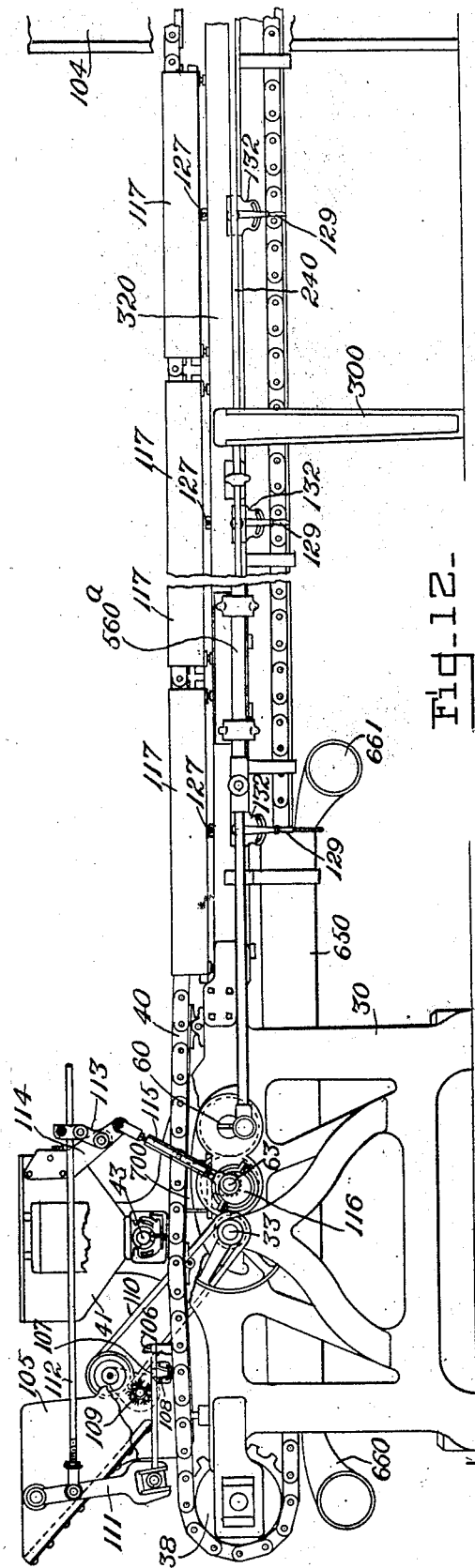
Figure 13:
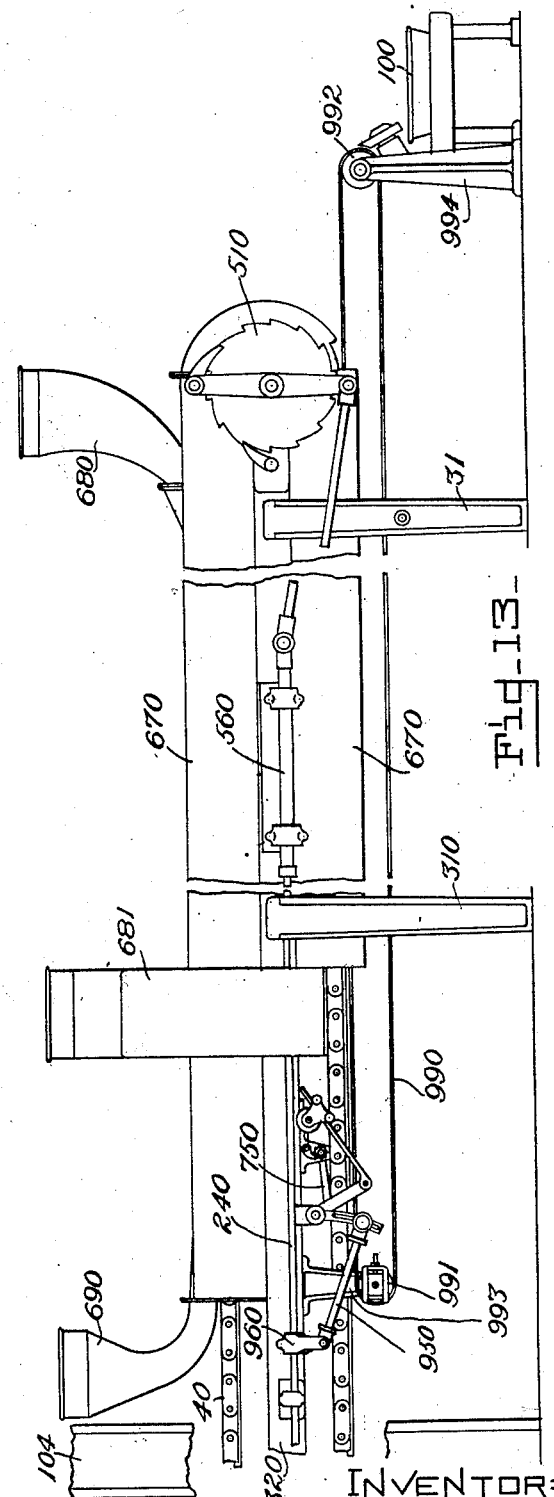

Figs. 12 and 13 collectively constitute a side elevation partly broken away, of another machine embodying the invention.

Figure 14:
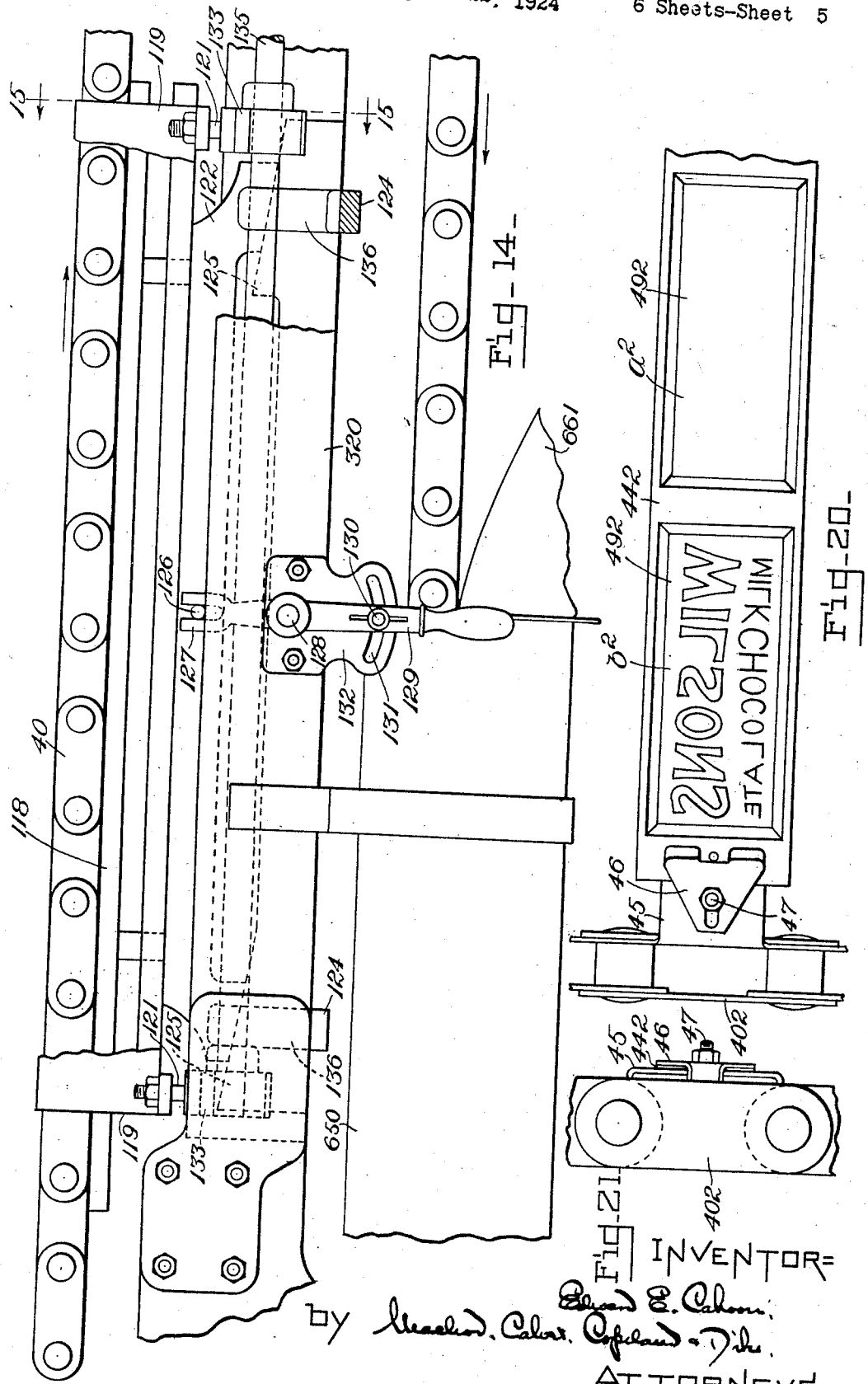

Fig. 14 is an enlarged side elevation, further broken away, of the vibrating mechanism employed in the machine illustrated in Figs. 12 and 13.

Figure 15:
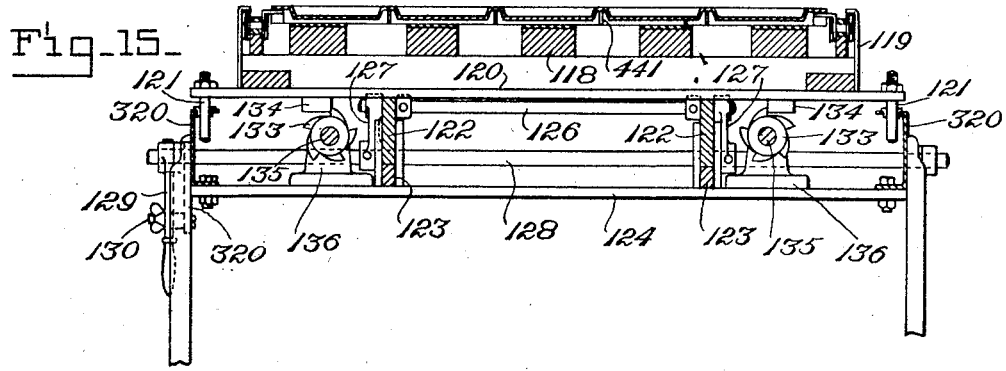

Fig. 15 is a transverse section taken substantially on the line 15—15, Fig. 14.

Figure 16:
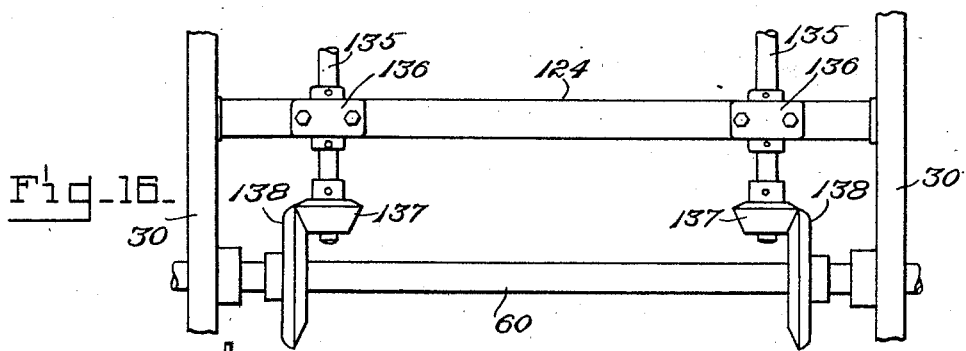

Fig. 16 is a detail plan view of the power transmitting connections for operating the vibrating mechanism.

Figure 17:
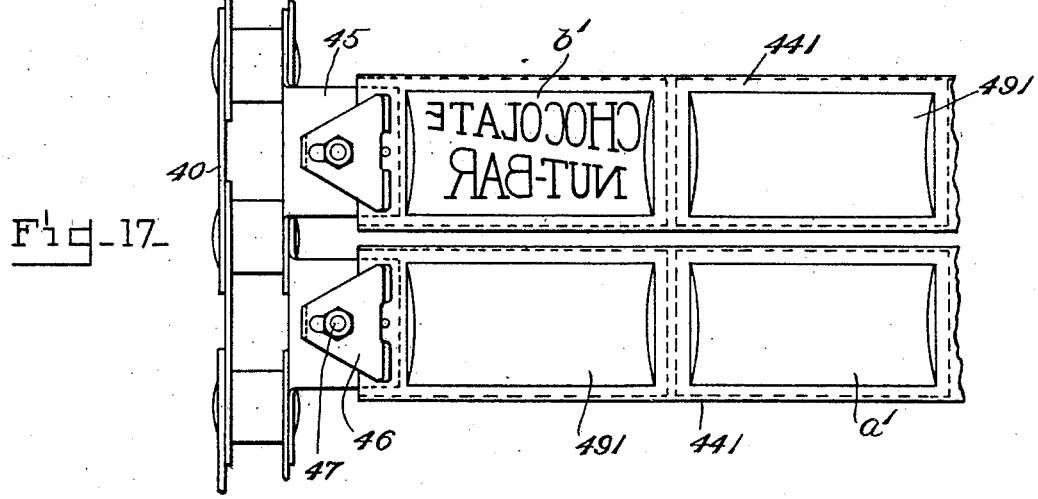

Fig. 17 is a view similar to Fig. 8 showing receiving members adapted for the production of chocolate bars.

Figures 18, 19:
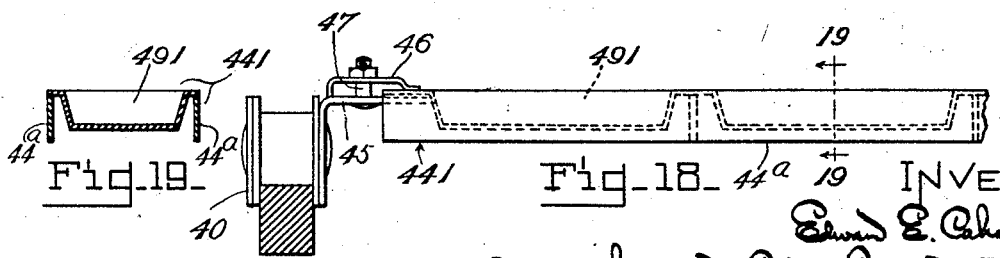

Fig. 18 is an edge view of one of the receiving members shown in Fig. 17, together with the means for connecting the same with one of the chains.

Fig. 19 is a detail section on the line 19, 19, Fig. 18.

Figs. 20 and 21 are views similar to Figs. 8 and 9, respectively, illustrating a receiving member adapted for the formation of chocolate bars or cakes of a larger size.

Referring to Figs. 1 and 2, the frame of the machine shown therein comprises uprights or standards 30 and 31 supporting a pair of parallel longitudinal members 32 in the form of channel bars (see also Fig. 4). Journalled in bearings carried by the standards 30 is a transverse power shaft 33 to which power may be applied from any suitable source, as through a loose belt pulley 34 controlled by a clutch 35. Journalled in suitable bearings at the front and rear ends of the frame are shafts 36 and 37 on which are mounted sprockets 38 and 39, said sprockets being arranged in pairs upon their respective shafts. Each sprocket 38 is connected with the corresponding sprocket 39 by a continuous chain 40, the two chains being disposed parallel with one another at opposite sides of the frame.

The upper reaches of the chains 40 are guided on longitudinal tracks 29 carried by transverse bars 28 supported on the tops of the side frame members 32, and the lower reaches of said chains are guided on tracks 27 carried by transverse bars 25 supported by hangers 26 from said frame members. The chains 40 constitute an endless conveyor which is intermittently moved longitudinally by mechanism hereinafter referred to.

Supported by the uprights 30 above the upper reaches of the conveyor adjacent the front end of the machine is mechanism for depositing the plastic chocolate or other material in predetermined quantities. Said mechanism is not shown in detail herein, as it may be of any type well known in the art, for example, that shown in Letters Patent No. 791,611, granted June 6, 1905, to Joseph M. Demerath. For the purpose of the present description, it is sufficient to state that said mechanism comprises a hopper 41 in which the plastic material is contained, a transverse series of nozzles 42 of a number depending upon the number of deposits to be made at each operation, and a measuring valve 43 periodically operated by suitable connections (not shown) with the main shaft 33 to control the passage of measured quantities of the material from the hopper 41 to the nozzles 42.

The material deposited from the nozzles 42 is received upon a series of receiving members 44 individually secured to the conveyor and moved successively thereby under the nozzles 42. Said members comprise metal slats or plates, preferably stiffened by longitudinal flanges 44$^a$, and having smooth or polished surfaces to receive the plastic material and which, if desired, may be suitably embossed to mold or impress the same. Said slats extend transversely between the chains 40 and are independently and detachably secured at their ends to said chains, respectively. To this end, and as shown most clearly in Figs. 8 to 10, each link of each of the chains has secured thereto a bracket 45 constituting one member of a clamp, the other member 46 of which is secured thereto by a bolt 47. The adjacent end of the receiving member 44 is supported on the bracket clamp member 45, being positioned thereon by a pin 48 on the bracket which is received in a perforation in the receiving member and being clamped to said bracket member by the clamp member 46 which is preferably bifurcated, as shown, to engage the upper face of said receiving member at opposite sides of the pin 48.

By means of the clamps above described, the receiving members may be readily applied to the chains or removed therefrom, thereby permitting the use of a wide variety of forms of receiving members in accordance with the particular confections or the like to be produced. The receiving members 44 shown in Fig. 10 and at the top in Fig. 8 are suitably embossed to form mold cavities 49 adapted for the production of drops 50 having molded bottoms. Said mold cavities 49 may have plain surfaces, as shown at $a$ in Fig. 8, or may be further embossed to mark the confections with a name or trade mark, as shown at $b$, or with an ornamentation, as shown at $c$. The receiving member 440 shown in Fig. 11 and at the bottom in Fig. 8, has a flat receiving surface suitable for the formation of unmolded drops 500, said surface being embossed at suitable points, as shown at $d$, to impress the bottoms of the confections with a name, trade mark, or ornament. The receiving members 441 shown in Figs. 17, 18 and 19, are formed with mold cavities 491 suitably shaped for the production of chocolate bars or cakes, and said cavities may have either plain surfaces, as shown at $a'$, or further embossed surfaces, as shown at $b'$. The receiving member 442 shown in Figs. 20 and 21 is provided with mold cavities 492 of a suitable shape to form somewhat larger cakes or bars than those formed by the members 441, which cavities may be either plain, as shown at $a^2$, or further embossed, as shown at $b^2$.

It will be seen that by interchanging the receiving members 44, 440, etc., and employing members having molding surfaces or cavities of the desired form and size, articles of an unlimited variety can be made upon the same machine. When it is desired to form relatively large articles, such, for example, as cakes of sweet chocolate, for which the mold cavities 492 shown in Fig. 20 are designed, mold members 442 of greater width than the mold members 44, 440 and 441 may be employed, in which case chains 402 having links of greater length than the links of the chains 40 may be substituted for the latter chains, the sprockets 38 and 39 being correspondingly replaced. In fact, the receiving members or plates may be of any width desired so long as they are capable of passing about the sprockets at the ends of the machine.

Between successive depositing operations of the valve 43, the conveyor is moved intermittently to bring successive receiving members 44 into position beneath the depositor. For this purpose, as herein shown, the shaft 37 has fast thereon a ratchet 51 held against retrograde movement by a holding pawl 52 and periodically advanced by an operating pawl 53 on a pawl carrier 54 pivotally mounted on said shaft. The pawl carrier 54 is connected by a link 55 with a reciprocating slide 56 (Fig. 3) longitudinally movable in guides 57 carried by one of the longitudinal frame members 32. The slide 56 is connected by a rod 24 with a second similar slide 56a (Figs. 1 and 2) longitudinally movable in guides 57a and operated through a pitman 58 from a crank disk 59 on a shaft 60 disposed substantially parallel to the shaft 33 and suitably journalled in bearings in the standards 30. The shaft 60 has fast thereon a gear 61 which meshes with a gear 62 on a third parallel transverse shaft 63 journalled in bearings in the standards 30, said gear 62 meshing with a pinion 64 on the main shaft 33, whereby the shafts 60 and 63 are rotated in unison from said shaft 33.

In order to heat the receiving members 44 to substantially the temperature of the plastic material deposited thereon, the lower reach of the conveyor, adjacent the sprockets 38 at the front of the machine, is enclosed by a heating chamber 65 which is suitably heated, as by steam pipes 66, the arrangement being such that the receiving members 44 pass successively through said heating chamber prior to their passage about the sprocket 38 to the depositing mechanism.

As each deposit is made, that portion of the upper reach of the conveyor immediately below the depositor is lifted into close proximity to the latter and thereafter depressed, as is usual in machines of this general type. As herein shown, the portion of the upper reach of the conveyor immediately beneath the depositor passes over a table 70 which is hinged at 23 to the tracks 29 and is periodically lifted by cams 71 on the shaft 63, said cams engaging an abutment 72 on the table which is vertically adjustable by means of a wedge 73 operated by an adjusting screw 74.

The plastic deposits 50 carried by the receiving members 44 are solidified by passage through a cooling or drying chamber 67 enclosing the upper reach of the conveyor beyond the depositing mechanism and through which the members successively pass after leaving said mechanism. As shown in Figs. 1 and 2, the chamber 67 is supplied at its rear end through a trunk 68 with cool, dry air from any suitable source, said air being exhausted from the forward end of the chamber through a trunk 69.

From the cooling or drying chamber 67, the receiving members with their solidified deposits pass about the sprockets 39 to the lower reach of the conveyor where they are freed of said deposits and whence they pass again to the heating chamber 65. For the purpose of freeing the members 44 of their deposits, which tend to adhere thereto, said members are subjected to the impact of a series of hammers 75 (see particularly Figs. 3, 4 and 5) which are pivotally mounted on a transverse shaft 76 supported by brackets 77 from the side frame members 32. The stroke of each hammer is effected under the influence of a torsion spring 78 surrounding the shaft 76, bearing at one end upon the hammer 75, and secured at its opposite end to a collar 79 fixed to the shaft 76 by a set screw 80. By loosening the set screw 80 and adjusting the collar 79 angularly on the shaft 76, the tension of any particular spring 78 may be adjusted, while all of said springs may be simultaneously adjusted by turning the shaft 76 in the brackets 77, said shaft being held in adjusted angular position by a pawl 81 (Fig. 3) which engages a ratchet 82 on the end of the shaft. The hammers 75 are alternately raised and released by means of trip cams 83 on a transverse shaft 84 journalled in the brackets 77 and provided, adjacent one end, with a ratchet 86 (see Figs. 6 and 7) which is periodically advanced to turn the shaft by means of a pawl 87 carried by a disk 88 rotatably mounted on the shaft 84 and secured to or formed integral with a pinion 85. The pinion 85 is engaged by a rack 89 which is held in engagement therewith by means of rollers 90 carried by arms 91 loose on the shaft 84. The rack 89 is longitudinally reciprocated to oscillate the pinion 85 and cause the pawl 87 to advance the ratchet 86 by means of a bell crank 92 (Figs. 2 and 3) pivoted at 93 to a bracket 94 carried by one of the frame members 32, said rack being pivotally connected to one arm of said bell crank the other arm of which is slotted, as shown at 92' in Fig. 3, for the adjustable connection of one end of a link 95 connected at its opposite end to an arm 96 on the reciprocating slide 56.

In order to prevent injury to the receiving members 44 under the impact of the hammers 75, there is preferably interposed between said members and hammers a striker plate 97 supported at its ends by brackets 98 from the side members 32. The impact of the hammers 75 is received by the striker plate 97 and transmitted therethrough to the members 44, causing the completed confections 50 to be loosened and to drop by gravity from the receiving members upon a conveyor belt 99 by which they are transported to the point of delivery and discharged into a suitable receptacle 100. The conveyor belt 99 passes about rollers 101 journalled in suitable bearings on a supporting frame 102 and one of which is positively driven, as through a sprocket chain 103, from the shaft 37.

In Figs. 12 and 13 is illustrated a further development of the invention intended for use in connection with the molding of relatively large pieces, such for example as those formed by the molds 441 and 442 illustrated in Figs. 17 to 21, and especially to the formation of nut bars and similar articles wherein nut meats or other solid objects are embedded in the plastic material. In molding relatively large cakes or other articles of this kind it has in practice been found necessary to jar the molds after the plastic material has been deposited therein in order to settle said material in the molds and cause the same to conform thereto as well as to free the material of air pockets. Also when nut meats or the like are inserted into the molds with the plastic material jarring is necessary in order to settle the plastic material about the nut meats and cause the latter to be evenly distributed therethrough.

As in the form of the invention first described, the frame of the machine shown in Figs. 12 and 13 comprises end uprights 30 and 31 connected by longitudinal frame members 320 which latter are somewhat longer than the corresponding frame members in the form of the invention first described and may, if desired, be supported intermediate their ends by additional uprights 300 and 310. Also as in the form of the invention first described, the plastic material from the hopper 41 is deposited by a measuring valve 43 upon receiving members 44 carried by an endless conveyor comprising a pair of chains 40 extending about sprockets at the opposite ends of the frame. The heating chamber 650 for heating the receiving members prior to their passage to the depositing mechanism, the table 700 for raising said members at the time of the depositing operation, the cooling or drying chamber 670 for solidifying the plastic deposits, the mechanism including the ratchet 510 for intermittently moving the conveyor, the hammers 750 with their operating mechanism for freeing the receiving members of the solidified deposits, the mechanism for operating said hammers, and the conveyor belt 990 for receiving the finished articles and transporting the same to the point of delivery are all the substantial equivalents in relative location and function to the corresponding parts in the form of the invention first described and may be substantially similar in construction except as hereinafter pointed out or as will be obvious from the drawings without description in detail.

As herein shown the heating chamber 650 is supplied with heated air from a suitable source through a trunk 660, said air being exhausted at the opposite end of the chamber through a second trunk 661.

The cooling or drying chamber 670 is located at the extreme rear end of the machine which may, if desired, be extended through a wall 104 into a suitably arranged cooling and drying room. In this form of the invention, said cooling chamber 670 extends about the rear end of the machine so as to enclose a portion of the lower, as well as a portion of the upper reach of the conveyor, the upper part of said chamber being supplied with cool, dry air through the trunk 680 and the lower portion thereof being supplied through the trunk 681, the air being exhausted through a trunk 690.

The hammer mechanism 750 is located forward of the lower section of the cooling chamber 670, the conveyor belt 990 being correspondingly extended, and the upper reach of said conveyor preferably passing through the lower section of said chamber. The rod 950 for operating the hammer mechanism is connected with an arm 960 on the rod 240 connecting the reciprocating slides 560 and 560ª. The rollers 991 and 992 for the conveyor belt 990 are carried respectively by brackets 993 depending from the frame members 320 and by standards 994.

Located in advance of the mechanism for depositing the plastic material, is mechanism for dropping nut meats or other solid articles into the molds. Said mechanism as herein shown comprises a hopper 105 within which the nut meats or other articles are contained and from which they are delivered in measured quantities by a measuring slide 106 having openings 107 for transferring the nut meats from said hopper to short spouts or chutes 108 by which they are delivered into the mold cavities. The superfluous meats are removed from the slide and pushed back to the hopper by a rotating brush 109 which is driven through a belt 110 from the main shaft 33. The slide 106 is reciprocated by an arm 111 connected by a rod 112 with a bell crank 113 pivoted to a bracket 114 on the hopper 41, said bell crank being connected by a rod 115 with an eccentric 116 on the shaft 63.

Between the depositing mechanism and the cooling chamber 670 the conveyor with its receiving or mold members passes over mechanism whereby said members are jarred or vibrated to settle the plastic material in the mold cavities. Said mechanism comprises a series of shaking tables 117 over which the upper reach of the conveyor passes and which may be of any suitable number. As shown in Figs. 14 and 15, each table comprises a frame 118 by which the receiving members 441 are supported, which frame is in turn supported by side plates 119 from a base plate 120, the latter having at its corners depending pins 121 which are guided for vertical movement in suitably disposed openings in the frame side members 320. Each plate 120 normally rests by gravity upon a pair of slides 122 the ends of which engage wedge shaped projections 125 formed on a pair of fixed longitudinal bars 123 supported by cross frame members 124 secured at their ends to the lower sides of the frame members 320. The slides 122 for supporting each table are rigidly connected for movement in unison by a transverse rod 126 the ends of which are engaged by bifurcated arms 127 on a transverse rock shaft 128 journalled in the frame members 320 and provided at one end with an operating handle 129. The handles 129 are provided with clamping bolts 130 which engage arcuate slots 131 in brackets 132 secured to the adjacent frame member 320, whereby said handles may be clamped in adjusted position. By operating any handle 129 the slides 122 controlled thereby may be moved longitudinally upon the wedge portions 125 of their bars 123, thereby adjusting said slides vertically to fix the normal vertical position of the corresponding shaking table. The tables are reciprocated vertically by means of trip cams 133 which engage bearing blocks 134 on the under sides of the plates 120, said cams being mounted on parallel shafts 135 journalled in bearings 136 supported by the cross frame members 124. The shafts 135 extend longitudinally of the machine under all of the shaking tables 117 and are of a length depending upon the number of tables employed. At their forward ends the shafts 135 are provided with bevel gears 137 (Fig. 16) which mesh with bevel gears 138 on the shaft 60.

By adjusting the slides 122 by means of the handle 129 the amount of vibration imparted to each shaking table by its cams 133 may be varied. Said slides 122 fix the lowermost vertical position of the table, while the cams 133 operate to lift the table to a fixed elevation, so that by varying the lower limit of movement of the table by adjustment of the slides 122 its amplitude of vibration may be determined, and by adjusting said slides into their highest position the bearing blocks 134 may be lifted out of the path of movement of the cams, thereby eliminating the vibration entirely.

The complete operation of the machine illustrated in Figs. 1, 2 and 3 is as follows:

The receiving members 44, as they travel along the lower reach of the conveyor, pass through the heating chamber 65 and are thereby heated to substantially the temperature of the plastic material to be deposited. Thereafter said members pass about the sprockets 38 and under the depositing nozzles 42, receiving from the latter, in their mold cavities or upon their surfaces, as the case may be, deposits of predetermined quantities of the plastic material. After leaving the depositor the receiving members pass through the cooling or drying chamber 67 in which the plastic deposits carried thereby are cooled and dried and thereby solidified. After passing through the chamber 67 the receiving members with their solidified deposits pass about the sprockets 39 and under the hammers 75 which act to free said members of said deposits, the latter, in the form of completed articles, falling upon the conveyor 99 by which they are delivered into the receptacle 100.

The operation of the machine shown in Figs. 12 and 13 is substantially identical with that previously described with the exception that the mold members, before passing under the depositor 43, are carried under the spouts or chutes 108 and receive from the latter measured quantities of nut meats or other solid articles which are subsequently covered by the plastic material from the depositor 43. Said mold members thereafter pass over the shaking tables 117 which agitate the molds sufficiently to settle the plastic material about the nut meats and distribute the latter evenly through the form of bars.

In the form of the invention last referred to, the cooling and drying chamber 670 is extended about the rear end of the machine, so as to enclose portions of both the upper and lower reaches of the conveyor, as above pointed out, in order to compensate, in part, for the longitudinal space required by the shaking tables 117.

It will be understood that the nut depositor shown in Fig. 12 may be omitted or disconnected if the machine is to be used in the manufacture of articles solely from plastic material, the shaking tables 117 being however preferably employed in the formation of relatively large articles in order to settle the plastic material into the molds to cause the same to conform to the latter and free it from air holes, as above explained.

It will also be understood that the particular type of mechanism for depositing the plastic material, or for forming the plastic deposits, may be varied widely within the scope of the invention, which is applicable to the manufacture of coated confections having centers of different material, as well as to articles which are the same throughout, depending upon the nature of the instrumentalities for operating upon the material prior to its deposit upon the conveyor.

Having thus described my invention, I claim:

1. In a machine of the character described, in combination, means for depositing plastic material in predetermined quantities, an endless conveyor including upper and lower reaches, and a series of separable individual members for receiving said material as they are successively brought beneath said depositor on the upper reach of said conveyor, means for moving said conveyor intermittently between successive depositing operations, means for warming said members prior to the deposit of material thereon, a cooling or drying chamber through which said upper reach of the conveyor passes beyond said depositor, and means located beyond said chamber for freeing said members of the cooled or dried deposits.

2. In a machine of the character described, in combination, means for depositing plastic material in predetermined quantities, an endless conveyor including upper and lower reaches and a series of separable individual members for receiving said material as they are successively brought beneath said depositor on the upper reach of said conveyor, means for moving said conveyor intermittently between successive depositing operations, means for warming said members prior to the deposit of material thereon, a cooling or drying chamber enclosing portions of the upper and lower reaches of said conveyor beyond said depositor, and means located beyond said chamber for freeing said members of the cooled or dried deposits.

3. In a machine of the character described, in combination, means for depositing plastic material in predetermined quantities, an endless conveyor having a series of individual members for receiving the material deposited, means for moving said conveyor intermittently between successive depositing operations, means for warming said members prior to the deposit of material thereon, means for solidifying the plastic deposits carried by said members, and means for freeing said members of the solidified deposits.

4. In a machine of the character described, in combination, a conveyor, means for intermittently moving said conveyor, said conveyor having a series of quick detachable receiving members provided with mold cavities, and mechanisms arranged in the order named in the direction of movement of said conveyor for successively warming said members, depositing loose solid articles in said mold cavities, depositing predetermined quantities of plastic material in said mold cavities, and vibrating said receiving members to settle said plastic material.

5. In a machine of the character described, in combination, a conveyor, means for intermittently moving said conveyor, said conveyor having a series of quick detachable receiving members provided with mold cavities, and mechanisms arranged in the order named in the direction of movement of said conveyor for successively warming said receiving members, depositing loose solid articles in said mold cavities, depositing predetermined quantities of plastic material in said mold cavities, vibrating said receiving members to settle said plastic material, solidifying the plastic deposits, and freeing said members of the solidified deposits.

6. In a machine of the character described, in combination, means for depositing plastic material in predetermined quantities, an endless conveyor including a series of separable individual members for receiving the material deposited, means for moving said conveyor intermittently between successive depositing operations, means for warming said members prior to the deposit of material thereon, means for solidifying the plastic deposits carried by said members, hammers for jarring said members to free them of the solidified deposits, and means for operating said hammers.

7. In a machine of the character described, in combination, means for depositing plastic material in predetermined quantities, an endless conveyor having upper and lower reaches and including a series of separable individual members for receiving the material deposited, means for moving said conveyor intermittently between successive depositing operations, hammers located between said reaches for jarring the members of the lower reach, and means for operating said hammers, said operating means being adjustable to vary the force of the blows struck by said hammers.

8. In a machine of the character described, in combination, means for depositing plastic material in predetermined quantities, an endless conveyor having upper and lower reaches and provided with members for receiving the material deposited, means for moving said conveyor intermittently between successive depositing operations, hammers located between said reaches for jarring the members of the lower reach, a striker plate interposed between said hammers and members, and means for operating said hammers.

9. In a machine of the character described, in combination, means for depositing plastic material in predetermined quantities, an endless conveyor having upper and lower reaches and provided with members for receiving the material deposited, means for moving said conveyor intermittently between successive depositing operations, hammers located between said reaches for jarring the members of the lower reach, a rod on which said hammers are pivoted, torsion springs on said rod for operating said hammers, and rotary cams for lifting said hammers against the tension of said springs and releasing the same.

10. In a machine of the character described, in combination, means for depositing plastic material in predetermined quantities, an endless conveyor having upper and lower reaches and provided with members for receiving the material deposited, means for moving said conveyor intermittently between successive depositing operations, hammers located between said reaches for jarring the members of the lower reach, a rod on which said hammers are pivoted, torsion springs on said rod for operating said hammers, said rod being rotatably mounted to adjust the tension of said springs, means for locking said rod in adjusted angular position, and rotary cams for lifting said hammers against the tension of said springs and release the same.

11. In a machine of the character described, in combination, means for depositing plastic material in predetermined quantities, an endless conveyor, and means for moving said conveyor intermittently between successive depositing operations, said conveyor including a series of quick detachable individual members having mold cavities to receive the material deposited and shape the same into predetermined form.

12. In a machine of the character described, in combination, means for depositing plastic material in predetermined quantities, a pair of parallel endless chains, means for moving said chains simultaneously and intermittently between successive depositing operations, clamps carried by the links of said chains, and a series of members for receiving the material deposited, said members extending transversely between said chains and being gripped at their ends by said clamps.

In testimony whereof I affix my signature.

EDWARD E. CAHOON.